(12) United States Patent
Panov

(10) Patent No.: US 11,274,607 B2
(45) Date of Patent: Mar. 15, 2022

(54) CONTROLLING A GAS TURBINE CONSIDERING A SENSOR FAILURE

(71) Applicant: Siemens Energy Global GmbH & Co. KG, Munich (DE)

(72) Inventor: Vili Panov, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 402 days.

(21) Appl. No.: 16/099,873

(22) PCT Filed: May 11, 2017

(86) PCT No.: PCT/EP2017/061283
§ 371 (c)(1),
(2) Date: Nov. 8, 2018

(87) PCT Pub. No.: WO2017/198528
PCT Pub. Date: Nov. 23, 2017

(65) Prior Publication Data
US 2019/0128192 A1 May 2, 2019

(30) Foreign Application Priority Data
May 18, 2016 (EP) ..................................... 16170217

(51) Int. Cl.
*F02C 9/28* (2006.01)
*G05B 23/02* (2006.01)

(52) U.S. Cl.
CPC ............ *F02C 9/28* (2013.01); *G05B 23/0254* (2013.01); *G05B 23/0283* (2013.01);
(Continued)

(58) Field of Classification Search
None
See application file for complete search history.

(56) References Cited

U.S. PATENT DOCUMENTS

| 5,408,412 | A  | * | 4/1995 | Hogg    | G01M 15/05 |
|-----------|----|---|--------|---------|------------|
|           |    |   |        |         | 701/29.1   |
| 6,999,906 | B2 | * | 2/2006 | Koehler | G05B 9/03  |
|           |    |   |        |         | 236/35     |

(Continued)

FOREIGN PATENT DOCUMENTS

| EP | 1096122 A1 | 5/2001 |
| EP | 1103926 A2 | 5/2001 |

(Continued)

OTHER PUBLICATIONS

Wikipedia Kalman Filter (Year: 2015).*

(Continued)

*Primary Examiner* — Arun Goyal
*Assistant Examiner* — William L Breazeal

(57) ABSTRACT

A system for controlling a gas turbine, includes a control system for providing control signals to a gas turbine; a tuning system for providing tuning signals, a modelling system for generating virtual measurement signals, the virtual measurement signals being based on the control signals and the tuning signals; a sensor diagnostics system for diagnosing at least one sensor measurement signal and outputting control system reconfiguration signals to the control system and tuner system reconfiguration signals to the tuning system, the tuning signals being based at least on the tuner system reconfiguration signals, the control signals being based on the at least one sensor measurement signal, the virtual measurement signals and the control system reconfiguration signals.

15 Claims, 6 Drawing Sheets

(52) U.S. Cl.
CPC ...... *F05D 2260/80* (2013.01); *F05D 2260/81* (2013.01); *F05D 2270/44* (2013.01)

(56) References Cited

U.S. PATENT DOCUMENTS

| | | | |
|---|---|---|---|
| 8,775,124 B2 | 7/2014 | Fijany et al. | |
| 2007/0118270 A1* | 5/2007 | Wiseman | F02C 9/00 701/100 |
| 2011/0016876 A1* | 1/2011 | Cataldi | F04D 27/0246 60/773 |

FOREIGN PATENT DOCUMENTS

| | | |
|---|---|---|
| EP | 1312781 A2 | 5/2003 |
| EP | 1591951 A2 | 11/2005 |
| EP | 1630635 A2 | 3/2006 |
| EP | 2239441 A2 | 10/2010 |
| EP | 2905666 A1 | 8/2015 |

OTHER PUBLICATIONS

Wells, W. R., and deSilva, C. W., "Failure State Detection of Aircraft Engine Output Sensors," Proceedings of Joint Automatic Control Conference. San Francisco, CA, Jun. 24, 1977, vol. 2, pp. 1493-1497.

Ellis, S. H., "Self-Correcting Control for a Turbofan Engine," 3rd International Symposium on Air Breathing Engines. Proceedings, West Germany, Mar. 7-12, 1976, pp. 171-186.; 1976.

European Search report for corresponding EP application 16170217.0.

International search report and written opinion for corresponding PCT/EP2017/061283.

* cited by examiner

CONTROLLING A GAS TURBINE CONSIDERING A SENSOR FAILURE

CROSS REFERENCE TO RELATED APPLICATIONS

This application is the US National Stage of International Application No. PCT/EP2017/061283 filed May 11, 2017, and claims the benefit thereof. The International Application claims the benefit of European Application No. EP16170217 filed May 18, 2016. All of the applications are incorporated by reference herein in their entirety.

FIELD OF INVENTION

The present invention relates to a system for controlling a gas turbine and to a method for controlling a gas turbine, wherein in particular a sensor failure is considered.

ART BACKGROUND

EP 1096122 A1 discloses control systems for the complex technical objects operating in wide range of modes and loads that can be used in the control systems of gas turbine engines, turbines of electrical power generating stations etc. According to the method the sensors are connected with state observers established on the base of engine model, one observer being connected with all sensors and each of remain observers with all sensors except one, the weighted sum of squared residuals of all observers is determined, the value of weighted sum of squared residuals of the first observer is compared with the values of weighted sums of squared residuals of the each observer from the remain ones, the maximum of received difference signal values is compared with threshold value and the failure signal is established for that sensor; indications of which are not used in observer for which this value exceeds the threshold, for each state observer is determined the region of possible residual locations, caused by the errors of predetermined parameters of object model, and it is defined that state observers the residuals of which are outside the limits of predetermined region.

EP 1312781 A2 discloses a method of detecting in-range engine sensor faults for a gas turbine engine associated with a helicopter including the steps of computing engine shaft horsepower for a plurality of engine sensor, computing a first mean horsepower from the plurality of engine sensors, computing the horsepower deviation from the first mean horsepower for each engine sensor, computing a horsepower deviation ratio for each engine sensor relative to all other engine sensors, disabling the engine sensor with the largest deviation from the first mean horsepower, computing a second mean horsepower, computing the horsepower deviation from the second mean horsepower for each engine sensor, re-computing the horsepower deviation ratio for each engine sensor relative to all other engine sensors, comparing the horsepower deviation ratios to predefined limits, and declaring a sensor fault if the horsepower deviation ratio for an engine sensor exceeds a predefined limit.

EP 1591951 A2 discloses a method for estimating a parameter based on signals received from redundant sensors, wherein at least a first sensed signal and a second sensed signal are received from at least corresponding first and second redundant sensors. The first sensed signal and the second sensed signal are indicative of the parameter, wherein the first sensed signal has associated therewith a first accuracy, wherein the second sensed signal has associated therewith a second accuracy. At least a reference signal indicative of the parameter is received, wherein the reference signal has associated therewith a reference accuracy, a weighting is determined based on at least the first sensed signal, the second sensed signal, and based on at least one of the first accuracy, the second accuracy, and the reference accuracy, and an estimate of the parameter is generated as a weighted average, according to the weighting, of at least a value of the first sensed signal, a value of the second sensed signal, and a value of the reference signal.

EP 1630635 A2 discloses a method and apparatus for detecting faults in power plant equipment using sensor confidence and an improved method of identifying the normal operating range of the power generation equipment as measured by those sensors, wherein a confidence is assigned to a sensor in proportion to the residue associated with that sensor. If the sensor has high residue, a small confidence is assigned to the sensor, if a sensor has a low residue, a high confidence is assigned to that sensor, and appropriate weighting of that sensor with other sensors is provided.

EP 2239441 A2 discloses an engine control system for a vehicle propulsion system including a plurality of engine model modules executing independently and programmed to receive engine operating condition values from a plurality of sensors positioned on an engine, each of the plurality of engine model modules programmed to determine an estimate of a process parameter of a location in the engine where at least one of a sensor for the process parameter is not available, a sensor for the process parameter is not present at the location, a sensor at the location has failed, and a sensor at the location is determined to be inaccurate, an estimate source selector configured to determine model blending factors, and a model blending module, configured to determine an estimated virtual sensor value using the determined estimates from at least two of the plurality of engine model modules and the model blending factors.

U.S. Pat. No. 6,999,906 discloses a reconfiguration method designed to be implemented in a computer system, for compensating failures of a sensor system comprising at least one sensor for measuring system states of an application system and at least one system model for describing the application system, which together form at least one first observer for estimating system states in order to provide system states for an allocated data processing device. Failure states for a first observer are determined from deviations, which occur as a result of the comparison between a number of states measured by the sensor or sensors and a state estimated by the system model.

U.S. Pat. No. 8,775,124 discloses a method for generating a set of analytical redundancy relations representative of a system with which a plurality of sensors is associated for the observation of variables indicative of operating conditions and adapted to enable detection and discrimination of faults. A complete set of analytical redundancy relations of the system is built from a set of intermediate relations established between observable and non-observable variables of the system, wherein each intermediate relation is generated by combining two predetermined relations.

US 2007/118270 A1 discloses a method and system for identifying in-range sensor faults in a gas turbine engine, by observing the tracked component qualities in an embedded model and recognizing anomalous patterns of quality changes corresponding to sensor errors, wherein an embedded model of the engine is employed to estimate sensed parameters and sensor failures are detected by identifying anomalous patterns in component quality parameters.

Conventionally, a hardware sensor redundancy may be improved in a gas turbine monitoring system, to improve reliability of the control system of the gas turbine. Hardware redundancy results may be costly, heavier, less practical and less reliable than various analytical redundancy strategies in the prior art.

The conventional methods and systems not in all circumstances properly address the control of a gas turbine in case of one or more sensor failures.

Thus, there may be a need for a system for controlling a gas turbine and for a method for controlling a gas turbine, wherein in particular the controlling the gas turbine may be improved, even in the case of one or more sensor failures.

SUMMARY OF THE INVENTION

This need may be met by the subject matter according to the independent claims. Advantageous embodiments of the present invention are described by the dependent claims.

Embodiments of the present invention relate to methods and systems that address a problem of a sensor failure in industrial gas turbines. The sensor failure thereby may be compensated by means of an analytical sensor redundancy (soft sensors). Dual (one hardware and one soft sensor) and triple (two hardware and one soft sensor) redundancy may in particular be addressed in embodiments of the present invention. Embodiments of the present invention may for example be applied to compressor delivery pressure measurement (one pressure transducer) and exhaust temperature measurement (two thermocouples) in industrial twin shaft gas turbine. Systems according to embodiments of the present invention may consist of a sensor fault detection, isolation and accommodation sub-system and further a reconfiguration of corresponding regulators in a dual lane control system.

According to an embodiment of the present invention it is provided a system for controlling a gas turbine, comprising: a control system for providing control signals to a gas turbine; a tuning system for providing tuning signals, a modelling system for generating virtual measurement signals, the virtual measurement signals being based on the control signals and the tuning signals; a sensor diagnostics system for diagnosing sensor measurements and outputting control system reconfiguration signals to the control system and tuner system reconfiguration signals to the tuning system, the tuning signals being based at least on the tuner system reconfiguration signals, the control signals being based on the at least one sensor measurement signal, the virtual measurement signals and the control system reconfiguration signals.

The control signals may control the operation of the gas turbine, in particular regarding fuel supply, compressed air supply, rotational shaft speed, rotational shaft power or the like. The control system may receive several input signals, such as demand values for one or more operational parameters, the control system reconfiguration signals, the sensor measurement and also the virtual measurement signals. The control system may for example comprise one or more PID controllers or PI controllers or the like which are adapted to derive a control signal based on a difference between a reference value and an actual value of one or more operational or demand parameters.

The tuning signal(s) may allow to tune or re-adjust the (parameters of) the modelling system. The modelling system may model the operation of the gas turbine using physical laws and mathematical equations, numerical methods and the like. The modelling system may simulate the operation of the gas turbine and may therefore also be able to deduce values of sensors which measure the operational parameter, the deduced signal also being referred to as virtual measurement signal. The sensor measurements may be supplied to the sensor diagnostic system. The diagnostic system may also receive the virtual measurement signal from the modelling system. A deviation of the sensor measurement signals from the virtual measurement signal may indicate a sensor failure or several sensor failures. The sensor failures may be more or less severe.

Both, the control system receives control system reconfiguration from the sensor diagnostics and also the tuning system receives tuner reconfiguration signals from the sensor diagnostics. Thereby, potentially detected sensor failure or sensor errors, detected and also optionally quantified by the sensor diagnostics system, influences both the control system and also the tuning system. Thereby, in case of failures of one or more sensors, the detection and compensation of these sensor failures or errors may be improved.

In particular, embodiments of the present invention provide a self-contained sensor diagnostics, isolation and accommodation system for utilization on the industrial gas turbine engine. The proposed system and method may incorporate control system reconfiguration logic and may be general enough to be applied to different engine configurations.

In particular, the gas turbine may be controlled by the control system which may generate the control signals (also referred to as control variables), based on the sensor measurements from available engine instrumentation. During a normal mode of operation, when no sensor failure is present, the accommodation tuning may consider a full set of estimated health parameters which may be derived by an estimator using all available sensor measurements. The tuning system may then align (or re-adjust) a real-time model (also referred to as modelling system) with the gas turbine, utilizing the estimated and predicted health parameters. The predicted health parameters may be generated by a dynamic non-linear gas turbine real-time model. For the given control signals (control variables) and the model tuning signals, the real-time model may generate virtual measurements which also may be used by the control system and the sensor diagnostics system.

In the sensor failure mode of operation, where one or more sensors have failed, the sensor diagnostics system may detect and isolate these faulty sensor measurements. The sensor diagnostics system may resolve two classes of sensor faults, namely hard (large-in-range) and soft (small-in-range or drift) sensor faults. Once when a sensor fault is detected and isolated, an accommodation of a particular fault may be initiated. The accommodation of sensor faults may be carried out through the reconfiguration of the tuning system and also the control system, i.e. using the control system reconfiguration signal(s) and the tuner system reconfiguration signal(s). When a sensor fault occurs, estimated health parameters which are generated by the estimator, may be affected and hence the tuning process carried out by the tuning system must be adjusted to account for this deficiency. This adjustment is, according to embodiments of the present invention, introduced into the tuning process via the tuner reconfiguration logic. Compensation of a sensor failure is also accounted with control system reconfiguration logic. Depending on the sensor fault classification, corresponding dual lane configuration in control system may be selected.

According to an embodiment of the present invention a simultaneous reconfiguration of control system and accommodation tuner based on applied sensor diagnostic logic may be achieved.

According to an embodiment of the present invention a gradual reconfiguration of dual lane logic and accommodation tuner, based on the probability of sensor faults, may offer the ability to accommodate in-range (hard) and out-of-range (soft) sensor failures.

According to an embodiment of the present invention a method for reconfiguration of control system logic is provided.

According to an embodiment of the present invention a method for accommodation of engine model estimator/tuner is provided.

According to an embodiment of the present invention, the system further comprises an estimator for estimating health parameters based on the measurement signals, the estimated health parameters being provided to the tuning system, the tuning signals being further based on the estimated health parameters. The health parameters may be estimated using available measurements from the engine instrumentation and they may reflect a "complete" set of component performance parameters.

Thereby, all necessary parameters defining the operation or evolution of the operation of the gas turbine may be determined. Furthermore, the tuning process may thereby be improved.

According to an embodiment of the present invention, the modelling system is further configured to generate predicted health parameters which are provided to the tuning system, the tuning signals being further based on the predicted health parameters.

When the tuning system receives the predicted health parameters as well as the estimated health parameters, further consistency checks may be done and the tuning signals may be adapted accordingly.

According to an embodiment of the present invention, the virtual measurement signals are also provided to the sensor diagnostic system, the control system reconfiguration signals and the tuner system reconfiguration signals further being based on the virtual measurement signals.

The sensor diagnostics system may compare the virtual measurement signals and the sensor measurement signals in order to detect or identify one or more sensor faults. Thereby, the control system reconfiguration signals as well as the tuner system reconfiguration signal may be derived for a better reconfiguration of the control system and/or the tuning system.

According to an embodiment of the present invention, the control system further comprises a first regulator for generating first control signals; a second regulator for generating second control signals; a control output switching system to output selectively the first or the second control signals, a state of the control output switching system being based on the control system reconfiguration signals.

The first regulator and also the second regulator may comprise or be a controller, such as a PI controller or a PID controller. The first regulator may be selected for outputting its first control signal, when there is substantially no sensor failure detected. In the case, a sensor failure is detected, the second control signals generated by the second regulator may be selected for output. The switching of the control output switching system may be triggered depending on the control system reconfiguration signals.

The control system may further comprise a sensor output switching system to selectively providing the at least one sensor measurement signal or the virtual measurement signal(s) to the second regulator, a state of the sensor output switching system being based on the control system reconfiguration signals.

According to an embodiment of the present invention, the sensor diagnostics system is adapted to determining sensor residuals being a difference between at least one sensor measurement signal and corresponding virtual measurement signals.

The residual may be determined as a difference between the sensor measurement signal and the virtual sensor measurement signal, the difference in particular being divided by the respective standard deviation of the sensor measurement uncertainty. The residuals may indicate the presence or absence of a sensor fault.

According to an embodiment of the present invention, control system reconfiguration signals define a condition for switching the control output switching system based on the sensor residual and at least one threshold. The threshold may for example be derived based on the difference between the sensor measurement signal and the virtual measurement signal and the standard deviation.

According to an embodiment of the present invention, control system reconfiguration signals define a condition for switching sensor output switching system based on the sensor residual and at least one threshold.

The switching states of the control output switching system and the sensor output switching system may be represented in a table in dependence of a condition regarding the residual(s). For example, if the residual is not greater than a threshold, the first sensor signals may be output and the first regulator may provide the first control signals to the gas turbine. If the residual is between two thresholds, a minimum threshold and a maximum threshold, the sensor output switching system may provide the at least one sensor measurement signal to the second regulator and the second control signals generated by the second regulator may be provided to the gas turbine. If the residual is larger than the maximum threshold, the sensor output switching system may provide the virtual measurement signal to the second regulator and the second regulator may provide its second control signals to the gas turbine.

In other embodiments, two sensor measurement signals or even more sensor measurement signals may be measured and considered and the sensor output switching system may be extended to selectively provide one of the two or more sensor measurement signals or the virtual measurement signal to the second regulator. Herein, the virtual measurement signals may represent the simulated sensor measurement signals, as simulated by the modelling system.

According to an embodiment of the present invention, the tuner system reconfiguration signals provided to the tuning system are used to adjust a turbine state transition matrix and Kalman filter gain matrix, based on the residuals, the adjusted turbine state transition and Kalman filter gain matrix defining evolution of operational states of the gas turbine.

The turbine state transition and filter gain matrix may allow the determination or calculation of the evolution of the state variables of the gas turbine. Via the dependence of the adjustment of the turbine state transition and filter gain matrix on the residuals, the adjusted turbine state transition and filter gain matrix may depend on the detected or isolated sensor failure(s). Thereby, the modelling of the operation of the gas turbine may be by providing the tuning signals to the modelling system, improved.

According to an embodiment of the present invention, the adjusted turbine state transition and Kalman gain matrix are defined as a product of a compensation matrix and the initial turbine state transition and Kalman gain matrix, the compensation matrix being diagonal and having elements differing from 1 depending on a magnitude of the corresponding residual.

The compensation matrix may be a quadratic matrix having all elements equal to 0 except for the diagonal (column index equals row index). The elements on the diagonal of the compensation matrix may be simple functions of the residual, in particular taking into account the maximum threshold and the minimum threshold. Thereby, a correction of the state transition and filter gain matrix or adjustment of the state transition and filer gain matrix is enabled in a simple manner.

According to an embodiment of the present invention, the at least one sensor measurement signal comprises a compressor discharge pressure measurement signal, wherein a rotation shaft power is controlled to be below a limit and/or compressor discharge pressure is limited according to predetermined schedule. Other applications are possible.

It should be understood that features individually or in combination, disclosed, explained or provided for a system for controlling a gas turbine may also, individually or in any combination, be applied to a method for controlling a gas turbine according to an embodiment of the present invention and vice versa.

According to an embodiment of the present invention it is provided a method for controlling a gas turbine, comprising: by a control system, providing control signals to a gas turbine; by a tuning system, providing tuning signals, by a modelling system, generating virtual measurement signals, the virtual measurement signals being based on the control signals and the tuning signals; by a sensor diagnostics system for diagnosing sensor measurements, outputting control system reconfiguration signals to the control system and tuner system reconfiguration signals to the tuning system, the tuning signals being based at least on the tuner system reconfiguration signals, the control signals being based on the at least one sensor measurement signal, the virtual measurement signals and the control system reconfiguration signals.

The method may be implemented in hardware and/or software. In particular, the method may involve executing a computer program in a processor comprising a logic/arithmetic unit.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings. The invention is not limited to the illustrated or described embodiments.

DETAILED DESCRIPTION

Figure 1:
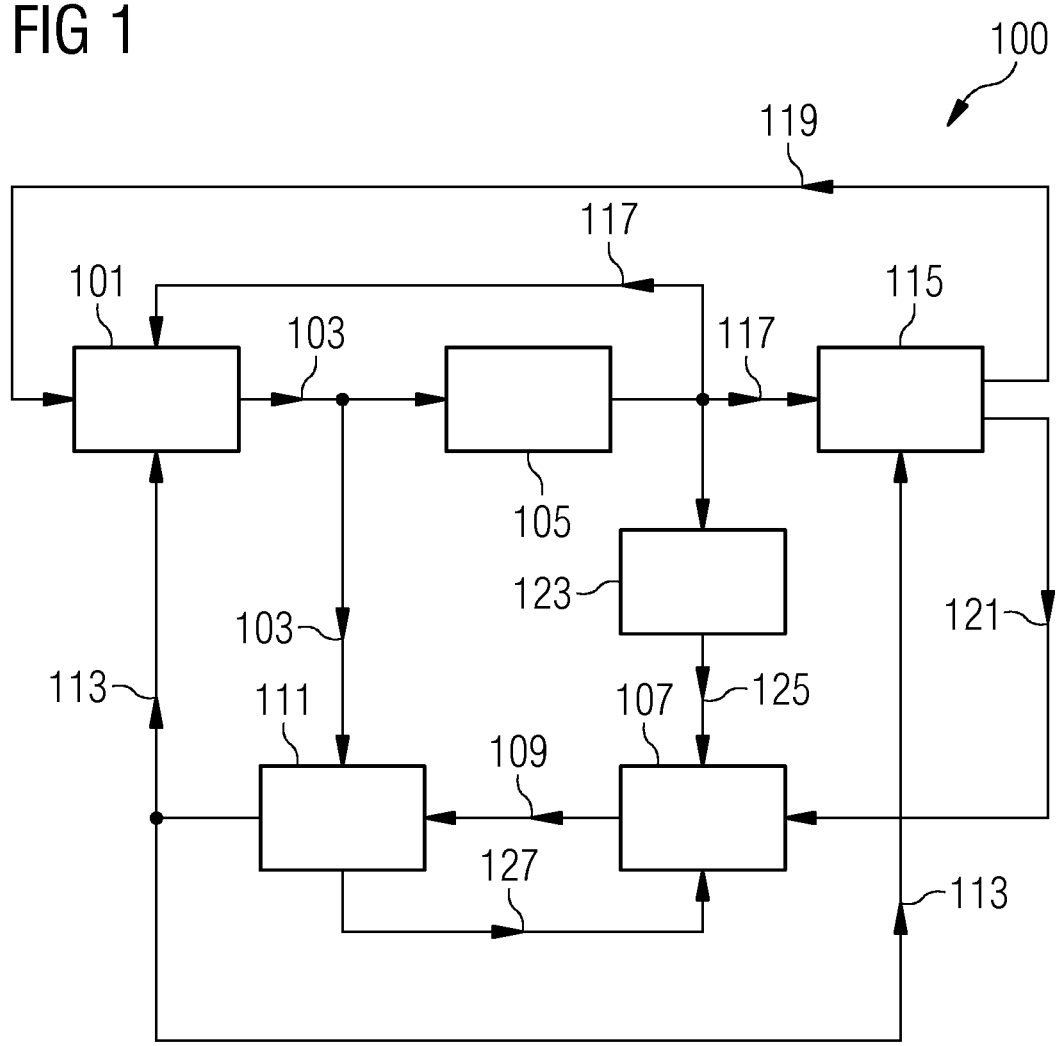
FIG. 1 schematically illustrates a system for controlling a gas turbine according to an embodiment of the present invention.

The illustration in the drawings is in schematic form. It is noted that in different figures, similar or identical elements are provided with the same reference signs or with reference signs, which are different from the corresponding reference signs only within the first digit.

FIG. 1 schematically illustrates a system 100 for controlling a gas turbine according to an embodiment of the present invention. The system 100 comprises a control system 101 for providing control signals 103 to a gas turbine 105. The system 100 further comprises a tuning system 107 for providing tuning signals 109 to a real-time model or modelling system 111. The system 100 further comprises the modelling system 111 for generating virtual measurement signals 113, wherein the virtual measurement signals 113 are based on the control signals 103 and the tuning signals 109. The system 100 further comprises a sensor diagnostics system 115 for diagnosing sensor measurements 117 of the gas turbine 105 and for outputting control system reconfiguration signals 119 to the control system 101 and for outputting tuner system reconfiguration signals 121 to the tuning system 107. Thereby, the tuning signals 109 are based at least on the tuner system reconfiguration signals 121. The control signals 103 are based on the at least one sensor measurement signal 117, the virtual measurement signals 113 and the control system reconfiguration signals 119.

The illustrative embodiment illustrated in FIG. 1 further comprises an estimator 123 for estimating health parameters 125 based on the measurement signals 117, wherein the estimated health parameters 125 are provided to the tuning system 107 and the tuning signals 109 are further based on the estimated health parameters 125.

In the example of the system 100 illustrated in FIG. 1, the modelling system 111 is further configured to generate predicted health parameters 127 which are provided to the tuning system 107 and the tuning signals are further based on the predicted health parameters 127. Furthermore, the virtual measurement signals 113 are also provided to the sensor diagnostics system 115 and the control system reconfiguration signals and the tuner system reconfiguration signals 119, 121 are further being based on the virtual measurement signals 113.

In case of a sensor failure, the sensor diagnostics system 115 detects and isolates the faulty sensor measurements 117. For example, the sensor diagnostics system 115 may be adapted to differentiate or resolve two classes of sensor faults, in particular hard sensor faults and soft sensor faults, the hard sensor fault being large-in-range, the soft sensor fault being small-in-range or drift fault. Once one or more sensor faults are detected and isolated, the tuning system 107 as well as the control system 101 is reconfigured using the tuner system reconfiguration signals 121 and control system reconfiguration signals 119, respectively.

The modelling system may be a non-linear dynamic gas turbine model or modelling system having an auto-tuning capability for generation of virtual measurements 113. The tuning system 107 is adjustable for compensation of different combinations of sensor failures and fault severities. According to this embodiment, the controlling system as well as the tuning system is (simultaneously) reconfigured in case of at least one sensor measurement fault. Furthermore, a gradual system reconfiguration may be supported based on the probability of sensor faults.

Embodiments of the present invention may provide robust and flexible sensor fault compensation, a high accuracy of the virtual measurement and increased stability and reliability of the control system.

In particular, an analytical sensor redundancy may be achieved by the use of the real-time engine model as implemented in the modelling system 101, for example. In particular, the modelling may comprise a non-linear dynamic gas turbine model with auto-tuning capability which may contribute to high accuracy of the virtual measurements. Auto-tuning of real-time model may align the engine model with the gas turbine to account for engine-to-engine variation and engine degradation and in this way removes distortion from virtual measurements. The ability to adjust the accommodation tuner (also referred to as tuning system 107) may contribute to the flexibility of the device system. The generation of virtual measurements 113 is based on the available sensor measurements and therefore adjustment of the accommodation tuner depends on the location, number and severity of the sensor faults. The system, as for example illustrated in FIG. 1, may accommodate different combinations of sensor failures and fault classes. The simultaneous reconfiguration of the control system and the accommodation tuner may provide a robust sensor fault compensation. The reconfiguration of control system and tuner may be dictated by the sensor diagnostics system 115 and may be based on the probability of these sensor faults.

The gradual reconfiguration of the device system may contribute to increase stability of control system. The combination of sensor faults in control system may be accommodated by selecting adequate combination of regulators and measurements in dual lane configuration.

Embodiments use analytical sensor redundancy to improve turbine engine control system reliability. Generally speaking two types of sensor redundancy, hardware and analytical may be distinguished. While hardware redundancy uses multiple sensors to measure the same engine variable, analytical redundancy uses a reference model of the engine to provide redundant estimates of a measured engine variable. In this application analytical redundancy is considered as a basis for proposed sensor fault detection and accommodation method.

In order to detect sensor faults, the maximum allowed measurement difference is typically considered for redundant sensors. Model-based compensation of measurement fault is usually resolved by introducing virtual engine sensors which are obtained via accurate engine modelling.

In this application real-time dynamic gas turbine engine model is used for generation of redundant virtual measurements. The engine model accuracy directly determines the validity of the model-based method for sensor fault diagnosis, and hence model with auto-tuning capability is deployed as a reference model of the gas turbine engine.

The sensor fault detection logic examines residuals between the redundant channels and determines a root cause when an anomalous signature is detected in these channels. When discrepancy between virtual and sensor measurement exceeds prescribed tolerance levels, the sensor fault diagnosis may determine state of switching logic in dual lane control configuration. Deployed logic may also be used for reconfiguration of auto-tuning process. When sensor fault occurs, estimation process may be affected, and hence tuning process must be adjusted to account for this deficiency.

Single and multiple sensor failures may have been simulated during gas turbine transient manoeuvre to assess capability of proposed model-based detection and accommodation method. Hard (large in-range) and soft sensor failures (small in-range or drift) may be injected during numerical simulation. It may be demonstrated that a method according to embodiments of the present invention can successfully support following tasks: detection of sensor malfunctioning, adaptation of auto-tuning process for reference engine model and reconfiguration of control system for accommodation of isolated measurement faults.

Embodiments of the present invention address redundancy in the sensor set. A method of incorporating sensor redundancy is software or analytic redundancy. This method requires a sensor model to determine when a sensor failure has occurred without redundant hardware sensor in the control system. An engine model can then provide an estimate of the correct value of the failed sensor's output to the control algorithm.

The use of conventional redundant multiple sensors may have some drawbacks when incorporated into control system. Hardware redundancy results in more costly, heavier, less practical, and less reliable systems than do various analytical redundancy strategies. Consequently many efforts in the past, investigated analytical redundancy strategies.

The sensor fault diagnosis methods are generally divided into three categories: models-based, knowledge-based and signal processing-based. More recently advanced approaches, based upon advanced statistical decision theory and optimal filtering have demonstrated advantages in soft failure diagnostic and isolation. This soft failure diagnostic capability is obtained at the cost of increased computational complexity. This additional complexity consists of two parts: the filtering and decision making logic, and a more accurate and therefore more detailed model. These methods may also demonstrate a trade-off between ability to accurately detect and time to detect.

In this application a model-based approach has been considered as a basis for fault diagnosis. This approach needs a pre-established engine model to acquire the analytical channel, so the model was generated by using engine component characteristics and thermodynamic equations. Model-based method may avoid the difficult problems of knowledge based maintenance and high robustness requirements of measurement data, and may be used to diagnose new sensor failures with no need of history experience or a priori knowledge.

The implemented sensor fault detection logic may, according to embodiments of the present invention, compare the redundant channels and determine a root cause when an anomalous signature is detected in these channels. Two typical residuals may be examined by detection logic (such as sensor diagnostics system 115), namely: cross-check and analytical residuals. In case of triplex redundancy, duplicate channels ($y_j^I$, $y_j^{II}$) may be sensor measurements from gas turbine, $y_j^{mdl}$ may be to output (e.g. virtual measurements 113) from the engine model, and cross-check residual may be defined as follows:

$$r_j^{CC} = \frac{|y_j^I - y_j^{II}|}{\sigma_j}$$

where $\sigma_j$ indicates standard deviations of the $j^{th}$ sensor measurement uncertainty.

This dual-channel residual for each available sensor set may be compared against a corresponding threshold $\tau_j^{CCR}$. If this residual does not exceed the prescribed threshold, the redundant measurements on both channels may be found acceptable. In case that residual are above threshold value:

$$r_j^{CC} > \tau_j^{CCR}$$

at least one channel may be assessed as faulty. When a dual channel fails, the sensor measurement may be replaced with the model output. The cross-check residual can only determine whether at least one channel of the dual-channel sensor is faulty, but cannot determine which channel is faulty. To address this shortcoming, usually analytical residual may be introduced as an additional sensor fault indicator.

Analytical residuals may be defined as follows:

$$r_j^k = \frac{|y_j^k - y_j^{mdl}|}{\sigma_j}$$

In case of duplex redundancy which consists of hardware and analytical sensor, only analytical residual can be determined and used for sensor diagnosis. The analytical residual computed for measurement channel may be compared against two threshold values $\tau_j^{min}$ and $\tau_j^{max}$. If an analytical residual exceeds a first threshold $\tau_j^{min}$, this may indicate the existence of soft failure, and if residual exceeds second threshold value $\tau_j^{max}$ hard sensor failure may be diagnosed.

Threshold selection for sensor fault classification may directly affect the results of fault diagnosis. Therefore, a rational selection of threshold values may be necessary to achieve desired accuracy of sensor fault diagnosis. Typically threshold values may be based on the statistical characteristics of sensor measurement noise and the model errors. The engine outputs measured by sensors may be expressed as follows:

$$y_j^k = y_j^{mdl} + \Delta y_j + v_j$$

The parameters $y_j^{mdl}$ and $\Delta y_j$ may represent engine model output and the modelling errors respectively. The parameter $v_j$ is zero-mean, normally distributed white noise that corrupts the measurements $v_j \sim N(0, \sigma_j^2)$.

The threshold of the analytical residual may be determined not only by the measurement noise but also by the modelling errors, and hence analytical residual may be expressed with following relation:

$$r_j^k = \frac{|y_j^k - y_j^{mdl}|}{\sigma_j} = \frac{|\Delta y_j + v_j|}{\sigma_j} = \left|\frac{\Delta y_j}{\sigma_j}\right| + \left|\frac{v_j}{\sigma_j}\right|$$

Considering that the random variables $$\left|\frac{v_j}{\sigma_j}\right|,$$

follow the standard normal distribution, min and max threshold values $\tau_j^{min}$ and $\tau_j^{max}$, can be calculated as follows:

$$\tau_j^{min} = \left|\frac{\Delta y_j}{\sigma_j}\right| + 2 \text{ for } 2\sigma \text{ rule with } P = 0.954$$

$$\tau_j^{max} = \left|\frac{\Delta y_j}{\sigma_j}\right| + 3 \text{ for } 3\sigma \text{ rule with } P = 0.997$$

For dual channel configuration, assuming that parameters $v_j^I$ and $v_j^{II}$ are the zero-mean, normally distributed white noise that corrupts the measurements on dual-channel and independent of each other, probability density function of dual-channel random residual $\Delta v_j = v_j^I - v_j^{II}$ is given as:

$$f(\Delta v_j) = \int_{-\infty}^{+\infty} f(v_j^I) \cdot f(v_j^I - \Delta v_j) dv_j^I = \frac{1}{2\sqrt{\pi}\, \sigma_j} e^{\left(-\frac{\Delta v_j^2}{4\sigma_j^2}\right)}$$

For dual-channel random residual $r_j = \Delta v_j = \sigma_j \sim N(0, 2)$, probability density function is given as:

$$f(r_j) = \frac{1}{\sqrt{\pi}} e^{\left(\frac{r_j^2}{4}\right)}$$

and in order to make sure as less misdiagnosis rate as possible, for probability of 99.7%, cross-check residual threshold is set to be as follows:

$$\tau_j^{CCR} = 4.5 \text{ for } 3\sigma \text{ rule with } P = 0.997.$$

Figure 2:
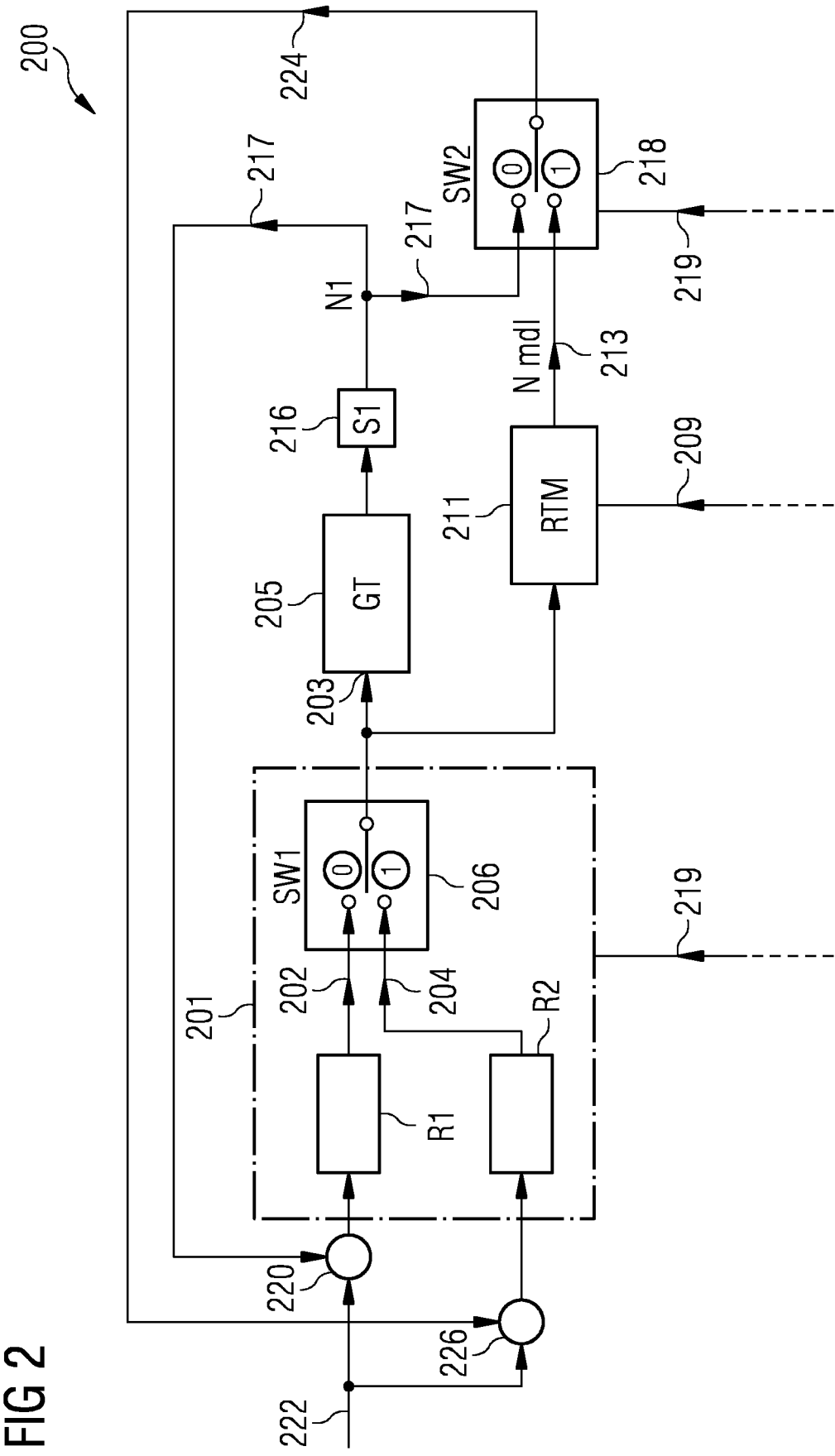
FIG. 2 schematically illustrates a portion of a system for controlling a gas turbine according to an embodiment of the present invention.
Figure 3:
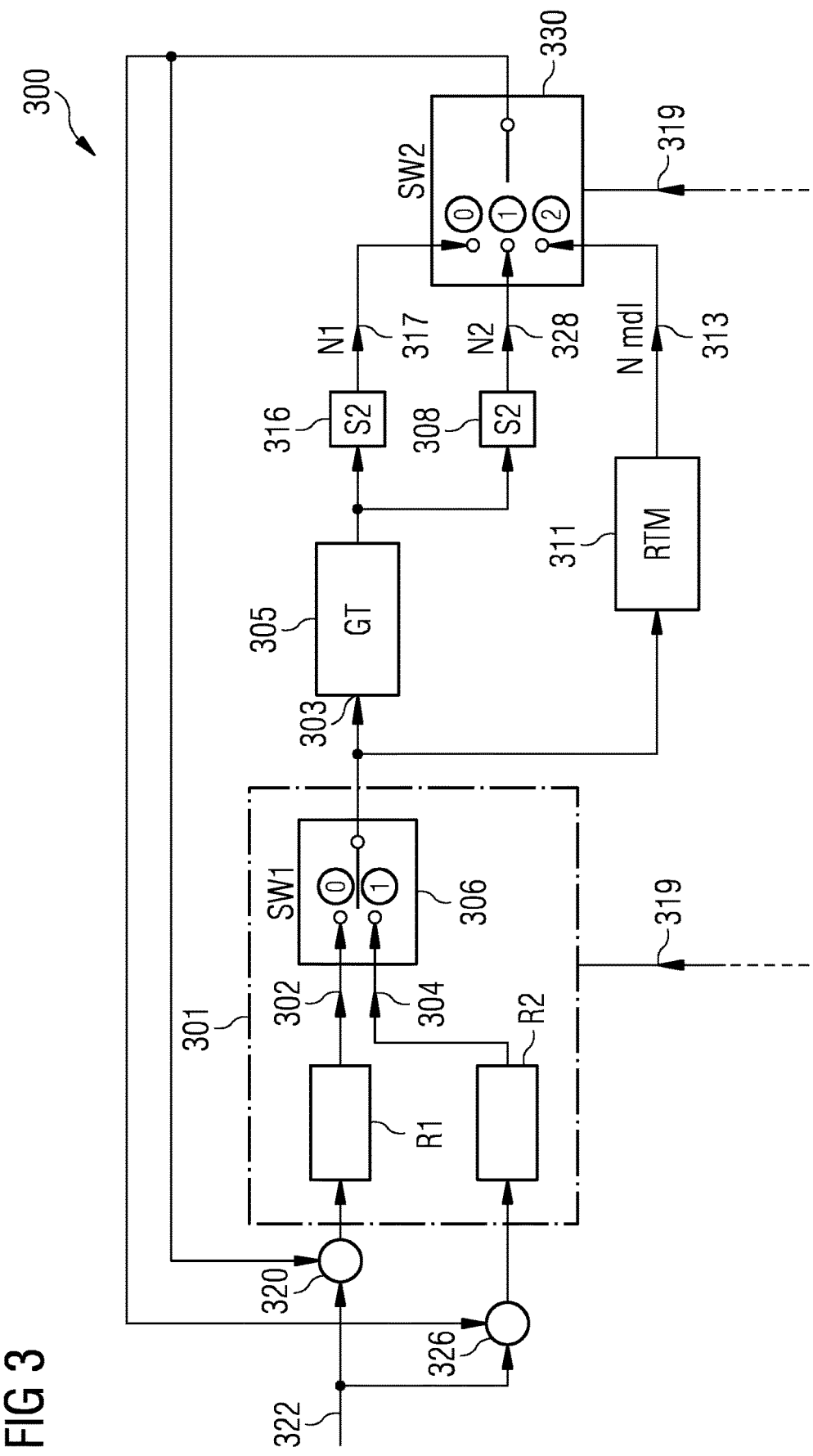
FIG. 3 schematically illustrates a portion of a system for controlling a gas turbine according to an embodiment of the present invention.

Dual lane redundancy may often be introduced into gas turbine control systems according to embodiments of the present invention, as illustrated in FIGS. 2 and 3 described below.

In the case of a single fault, the instrumentation redundancy may significantly improve reliability of the measurement chains. In dual lane configuration both lanes may simultaneously measure engine parameters and compare the current data. This approach may enable sensor health monitoring to be conducted via the comparison of the engine parameters collected from both lanes, where one lane is the control mode and another one is in the back-up mode. Once when instrument fault is confirmed lane switching may be initiated.

The total duration of fault confirmation and lane switching must not exceed the critical time limit for the system. The fault confirmation probability may increase with the time of the parameter being outside the allowed band. Simultaneously, the successful switching probability or fault accommodation decreases with this time and hence lane switching logic must be done with care.

FIGS. 2 and 3 show the use of on-line engine modelling in condition monitoring with dual lane control system and lane-to-lane switching logic. FIG. 3 depicts triple redundancy where in the case of a double sensor fault in both lanes, the gas turbine control can be carried out with use of a virtual sensor. FIG. 2 show double redundancy case, which may be achieved with one hardware and one software sensor.

Reference signs which label elements, signals or quantities having same or similar structure and/or function in FIGS. 1, 2, 3, 4, 5 and 6 are labelled with reference signs only differing in the first digit.

FIG. 2 schematically illustrates a portion of a system 200 for controlling a gas turbine according to an embodiment of the present invention. Thereby, the system 200 comprises a modelling system 211 outputting virtual measurements 213. The system 200 illustrates an example, where one sensor 216 measures an operational parameter of the gas turbine 205. The measurement signal 217 is provided to a switching element 218 (SW2) to which also the virtual measurements 213 are supplied.

The switching element SW2 may also be considered as part of the control system 201 outputting the control signal 203 to the gas turbine 205. Thereby, the control system 201 comprises a first regulator R1 and a second regulator R2, wherein the first regulator generates first control signals 202 and the second regulator R2 generates second control signals 204 which are provided to a switching element 206 (SW1). The switching element 206 may be controlled regarding its switching state to selectively provide the first control signals 202 or the second control signals 204 to the gas turbine 205. The measurement signals 217 are provided to a subtraction element 220 to which also a reference value 222 is supplied. The selected measurement signal 224 selected by the selecting element 218 is provided to another subtraction element 226 to which also the reference value 222 is provided. The difference between the selected measurement value 224 and the reference value 222 is supplied to the second regulator R2. The control system 201 receives the control system reconfiguration signals 219 and, based on them, switches the state of the switching element 206 (SW1). Furthermore, the control system reconfiguration signal 219 may also govern the state of the switching element 218 (SW2). The modelling system 211 receives tuning signals 209 from a tuning system, such as the tuning system 107 illustrated in FIG. 1. These tuning signals 209 also depend on tuner system reconfiguration signals which are output by a sensor diagnostics system, such as sensor diagnostics system 115, as is illustrated in FIG. 1.

In case of one software and one hardware measurement, the objective of on-line diagnosis for sensors is to detect and isolate faults as early as possible. FIG. 2 represents structure of the on-line system composed of the real-time engine model and lane switching logic. It utilizes engine model 211 as an analytical second channel for gas turbine application. When discrepancy between virtual and sensor measurement exceeds prescribed tolerance levels, the sensor fault diagnosis logic (such as sensor diagnostics system 115 as illustrated in FIG. 1) may determine state of switching logic in dual lane configuration according to table 1.

TABLE 1

| Condition | S1 | Smdl | R1 | R2 | SW1 | SW2 |
|---|---|---|---|---|---|---|
| $r_j^I \le \tau_j^{min}$ | X | | X | | 0 | 0 |
| $\tau_j^{min} < r_j^I < \tau_j^{max}$ | X | | | X | 1 | 0 |
| $\tau_j^{max} \le r_j^I$ | | X | | X | 1 | 1 |

In dual redundancy configuration if soft failure of sensor is indicated, lane logic may select lane with conservative control settings. In case that sensor hard failure is detected, the faulty sensor signal used for control system may be replaced by the virtual measurement.

In case of one software and two hardware measurements, real-time model may provide the analytical third channel against which dual channel measurements are compared, as illustrated in FIG. 3.

Herein, the configuration is similar to the configuration as illustrated in FIG. 2 with the exception that a further sensor 308 measures, redundantly with the sensor 316, one or more operational parameters of the gas turbine 305. The sensor measurements 317 and 328 are provided to a three state switching element 330 to which also the virtual measurements 313 generated by the modelling system 311 are provided. The state of the switching element 330 may also be affected by the control system reconfiguration signals 319 provided to the control system 301 from which the switching element 330 may be a part of.

Considering the measurement noises and modelling errors, sensor dual channel threshold and analytic threshold may be designed and used in proposed logic. When the difference among triplex channels violates certain tolerance levels, the logic determines lane switching configuration, as is e.g. given in table 2 below.

TABLE 2

| Condition | | S1 | S2 | Sm | R1 | R2 | SW1 | SW2 |
|---|---|---|---|---|---|---|---|---|
| $r_j^{CC} \le \tau_j^{CCR}$ | | | | | | | | |
| | $r_j^I \le \tau_j^{min}$    $r_j^{II} \le \tau_j^{min}$ | X | X | X | | | 0 | 0/1 |
| $r_j^{CC} > \tau_j^{CCR}$ or $r_j^{CC} \le \tau_j^{CCR}$ | | | | | | | | |
| | $r_j^I \le \tau_j^{min}$    $\tau_j^{min} < r_j^{II} < \tau_j^{max}$ | X | | | X | | 0 | 0 |
| | $\tau_j^{min} < r_j^I < \tau_j^{max}$    $r_j^{II} \le \tau_j^{min}$ | | X | | X | | 0 | 1 |
| | $\tau_j^{min} < r_j^I \ll \tau_j^{max}$    $\tau_j^{min} < r_j^{II} < \tau_j^{max}$ | X | | | | X | 1 | 0 |
| | $\tau_j^{min} < r_j^I < \tau_j^{max}$    $\tau_j^{min} < r_j^{II} \ll \tau_j^{max}$ | | X | | | X | 1 | 1 |
| | $\tau_j^{min} < r_j^I < \tau_j^{max}$    $\tau_j^{max} \le r_j^{II}$ | X | | | | X | 1 | 0 |
| | $\tau_j^{max} \le r_j^I$    $\tau_j^{min} < r_j^{II} < \tau_j^{max}$ | | X | | | X | 1 | 1 |
| | $\tau_j^{max} \le r_j^I$    $\tau_j^{max} \le r_j^{II}$ | | | X | | X | 1 | 2 |

The devised logic indicates that a sensor fault may be isolated when the dual channel residual of particular measurement exceeds the threshold, and also, this measurement's analytical residual exceeds the threshold in either one or both channels. If the threshold violation of the analytical residual occurs only in one channel, the channel that caused this violation may be identified as faulty one and fault may be classified as soft or hard. If the threshold violation occurs in both channels, depending on the classification of detected faults, lane switching logic may determine configuration of active control loop. When both channels of this measurement are diagnosed with hard failure, the faulty sensor signal used for control system may be replaced by the virtual measurement.

The model-based approach needs a pre-established engine model to acquire the analytic measurement channel. The detailed dynamics model of gas turbine engine may, according to embodiments of the present invention, be mathematically described by a set of nonlinear differential equations as follows:

$$\dot{x} = f_x(x, h, u, v)$$

where the distributed aero-thermodynamic, mechanical and electrical processes are lumped into a state coordinate vector x. For n state variables, n sets of the above equation must be written. Controls, u, operating conditions, v, and health parameters, h, are quantities which can be distinguished by measurement or manipulation.

Measurements may be taken on various quantities in the engine. These sensed parameters may be related to the states, inputs and parameters according to the general algebraic expression:

$$y = g_y(x, h, u, v)$$

where in general, vector y consists of measurable and non-measurable parameters. Above equations may be general enough to provide a starting point to define the fault detection problem relative to control design and state estimation.

After an accurate model is developed for the generic baseline, the engine model may be expanded to include data representing the deteriorated engine. These effects could include various efficiency changes, area changes, pressure drops, as well as flow changes and disturbances due to bleed effects. Typically, the two quantities, capacity and efficiency can be used to model changes in component operation resulting in decreased energy conversion efficiency or component flow characteristics.

The health parameters considered by deployed model may be: efficiency and capacity in the compressor and compressor turbine & efficiency of the combustor and power turbine:

$$h = [\eta_{comp}^h, \Gamma_{comp}^h, \eta_{ct}^h, \Gamma_{ct}^h, \eta_{pt}^h, \eta_{comb}^h]$$

The selected set of health parameters may be estimated using available measurements from engine instrumentation and they may be chosen to reflect a "complete" set of component performance parameters.

These parameters certainly do not reflect necessary complexity to accurately represent the microscopic process occurring in the gas path, but from perspective of performance monitoring, this requirement may not be necessary. Selected health parameters can infer performance changes in one or more components of the system, and they can be used for detection of typical gas turbine degradation\fault modes (compressor fouling, turbine erosion, turbine tip rub, etc.).

The engine model accuracy may directly determine the validity of the model-based method for sensor fault diagnosis. The engine model utilised in fault diagnosis and accommodation must be sufficiently accurate and operate in real time. These requirements make general gas turbine models ineffective due to not-accounting for individual engine characteristics and environmental conditions.

Since the general gas turbine model may represents "nominal" engine, it must be adapted to the performance of the real engine as it deviates from nominal baseline with time. To address this problem, tuning of the engine model can be performed so that model aligns to the actual engine being monitored using model based tracking approach.

In this application performance tracking may be achieved by the two step process. The gas turbine health parameters may be estimated by performance estimation tool, and then subsequently they may be introduced into dynamic real-time model via model tuner.

The estimated health parameters z based on the measurements from engine instrumentation may be compared with smoothed estimates of health variables $\hat{z}$, where the resulting vector may then be used for generation of model tuners $\xi$ and correction of the state variables x:

$$\dot{\xi} = f_\xi(\xi, \hat{h}) + K(z - \hat{z})$$

where function K represents tuner gain and vector $\hat{\xi}$ consists of tuning parameters estimates.

Therefore gas turbine dynamic model, expanded with model tuner may take following form:

$$\dot{\hat{x}} = f_x(\hat{x}, \hat{h}, u, v, \hat{\xi})$$

$$\hat{y} = g_y(\hat{x}, \hat{h}, u, v, \hat{\xi})$$

where vectors $\hat{x}$ and $\hat{h}$ represent the estimates of the state variables and predicted health parameters, respectively. Computational scheme for implemented Kalman based tuner is given in figure FIG. 4.

Figure 4:
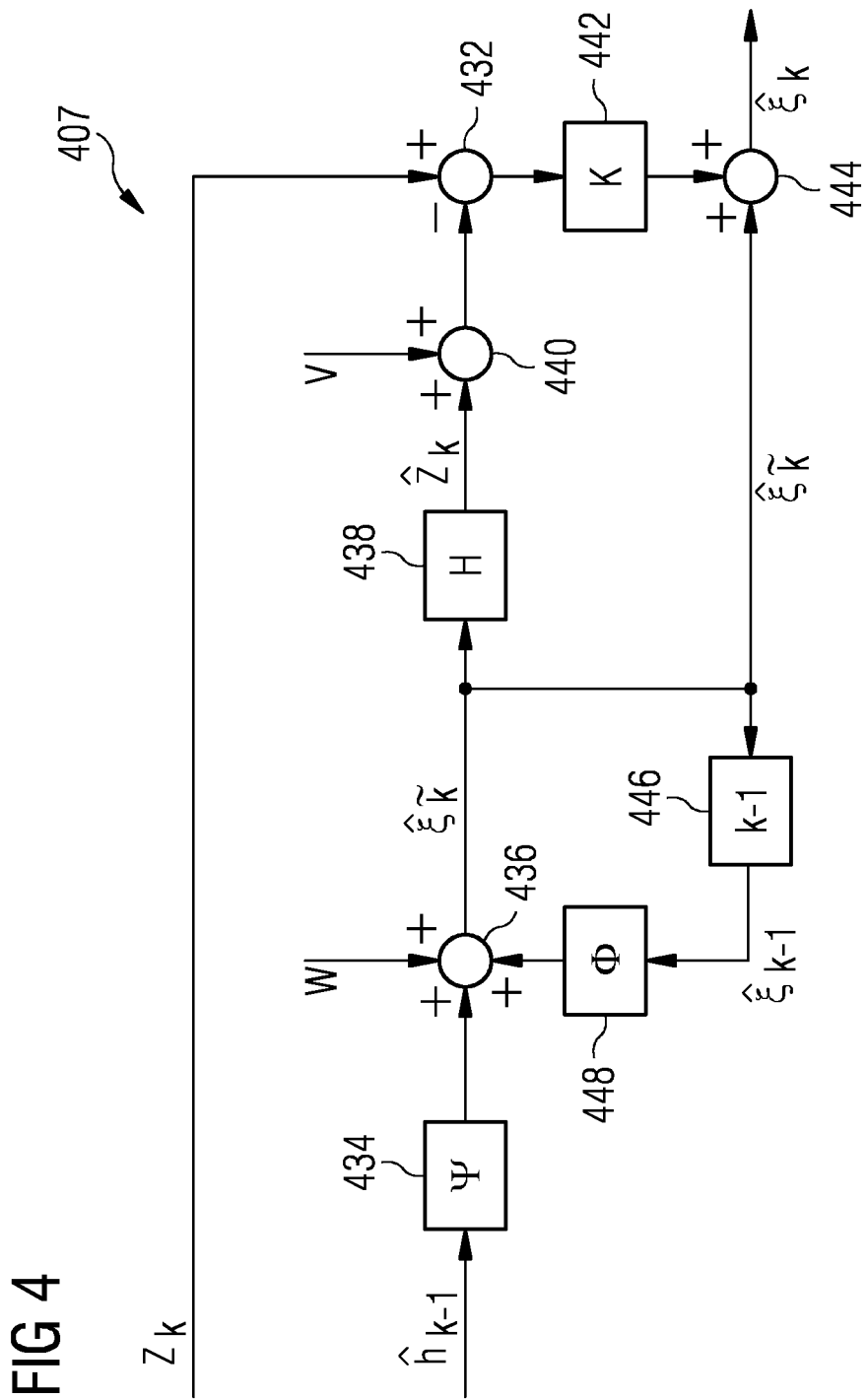
FIG. 4 schematically illustrates a tuning system which may be comprised in a system for controlling a gas turbine according to an embodiment of the present invention.

FIG. 4 schematically illustrates a tuning system 407 according to an embodiment of the present invention which may for example be used as a tuning system 107 as illustrated in FIG. 1. The quantity $z_k$ represents estimated health parameters and is supplied to a subtraction element 432. The predicted health parameters $h_{k-1}$ are provided to a function block 434 which applies the function $\Psi$ and the output is provided to a summation element 436 to which also the quantity w is provided, indicating tuning process noise, which is white and with normal probability distribution.

The output of the summation element 436 is supplied to the function element 438 which applies the function H and the output is provided to another summation element 440 to which also the quantity v is provided, indicating measurement noise. The output of the summation element 440 is provided to the subtraction element 432. The output of the subtraction element 432 is provided to a function block 442 which applies the function K and the output is provided to a further summation element 444. The output of the summation element 436 is further provided to the element 446 whose output is provided to the function element 448 which applies the function $\Phi$ and the output is provided to the summation element 436.

Continuous time invariant model of the tuning process in implemented observer structure:

$$\dot{\xi} = f_h(\xi, h)$$

may be represented with linear model in the following form:

$$\dot{\xi}(t) = \Phi \xi(t) + \Psi h(t) + w$$

where state and input transition model may be described with diagonal matrices Φ and Ψ respectively. The tuner states may be represented with tuned health vector:

$$\xi=[\eta_{comp}{}^{\xi},\Gamma_{comp}{}^{\xi},\eta_{ct}{}^{\xi},\Gamma_{ct}{}^{\xi},\eta_{pt}{}^{\xi},\eta_{comb}{}^{\xi}]$$

The state transition matrix Φ:

$$\Phi=\mathrm{diag}(\phi_{\xi\_\eta_{comp}},\phi_{\xi\_\Gamma_{comp}},\phi_{\xi\_\eta_{ct}},\phi_{\xi\_\Gamma_{ct}},\phi_{\xi\_\eta_{pt}},\phi_{\xi\_\eta_{comb}})$$

relates to the tuner states. The second transition matrix Ψ:

$$\Psi=\mathrm{diag}(\psi_{h\_\eta_{comp}},\psi_{h\_\Gamma_{comp}},\psi_{h\_\eta_{ct}},\psi_{h\_\Gamma_{ct}},\psi_{h\_\eta_{pt}},\psi_{h\_\eta_{comb}})$$

relates to the predicted health parameters, where transition matrices satisfy following conditions:

$$\Psi=I-\Phi \text{ and } 0\leq\Phi\leq I.$$

Measurement model in the implemented tuner may be represented with following equation:

$$z(t)=H\xi(t)+v$$

where H is the measurement sensitivity matrix and v is measurement noise.

Observation model represented with matrix H in this application may be represented with unit matrix:

$$H=I$$

assuming that estimated health parameters are the tuning model states, i.e. tuners directly.

When sensor fault occurs, estimation process may also be affected, and hence tuning process must be adjusted to account for this deficiency. This adjustment may be introduced into tuning process via transition Φ and Kalman gain matrix K:

$$\Phi = \begin{bmatrix} \phi_{\eta_{COMP}} & & & & & 0 \\ & \phi_{\Gamma_{COMP}} & & & & \\ & & \phi_{\eta_{CT}} & & & \\ & & & \phi_{\Gamma_{CT}} & & \\ & 0 & & & \phi_{\eta_{PT}} & \\ & & & & & \phi_{\eta_{COMB}} \end{bmatrix};$$

$$K = \begin{bmatrix} \kappa_{\eta_{COMP}} & & & & & 0 \\ & \kappa_{\Gamma_{COMP}} & & & & \\ & & \kappa_{\eta_{CT}} & & & \\ & & & \kappa_{\Gamma_{CT}} & & \\ & 0 & & & \kappa_{\eta_{PT}} & \\ & & & & & \kappa_{\eta_{COMB}} \end{bmatrix}$$

The number of elements in transition matrix which have to be adjusted may depend on the set of sensors that are affected.

As an example below are given transition matrices for two failure cases considered in this application as examples.

In case of compressor delivery pressure measurement fault, only estimation of power turbine efficiency may not be effected and hence transition and Kalman gain matrix structure may take the following form:

$$\Phi = \begin{bmatrix} 0 & & & & & \\ & 0 & & & 0 & \\ & & 0 & & & \\ & & & 0 & & \\ & 0 & & & \phi_{\eta_{PT}} & \\ & & & & & 0 \end{bmatrix}; K = \begin{bmatrix} 0 & & & & & \\ & 0 & & & 0 & \\ & & 0 & & & \\ & & & 0 & & \\ & 0 & & & \kappa_{\eta_{PT}} & \\ & & & & & 0 \end{bmatrix}$$

On another hand in case of exhaust thermocouples fault, only power turbine efficiency estimate may be affected, and structure of transition and Kalman gain matrix may be as follows:

$$\Phi = \begin{bmatrix} \phi_{\eta_{COMP}} & & & & & \\ & \phi_{\Gamma_{COMP}} & & & 0 & \\ & & \phi_{\eta_{CT}} & & & \\ & & & \phi_{\Gamma_{CT}} & & \\ & 0 & & & 0 & \\ & & & & & \phi_{\eta_{COMB}} \end{bmatrix};$$

$$K = \begin{bmatrix} \kappa_{\eta_{COMP}} & & & & & \\ & \kappa_{\Gamma_{COMP}} & & & 0 & \\ & & \kappa_{\eta_{CT}} & & & \\ & & & \kappa_{\Gamma_{CT}} & & \\ & 0 & & & 0 & \\ & & & & & \kappa_{\eta_{COMB}} \end{bmatrix}$$

Correction of state transition and Kalman gain matrix for compensation of sensor fault in generalized form can be expressed with following formulation:

$$\Phi=\Phi\cdot\Pi\Omega_i^{comp} \text{ and } K=K\cdot\Pi\Omega_i^{comp}$$

Correction process may be based on the compensation matrices:

$$\Omega_i^{comp} = \begin{bmatrix} \omega_{\eta_{COMP},i}^{comp} & & & & & \\ & \omega_{\Gamma_{COMP},i}^{comp} & & & 0 & \\ & & \omega_{\eta_{CT},i}^{comp} & & & \\ & & & \omega_{\Gamma_{CT},i}^{comp} & & \\ & 0 & & & \omega_{\eta_{PT},i}^{comp} & \\ & & & & & \omega_{\eta_{COMB},i}^{comp} \end{bmatrix}$$

where each compensation matrix element may represent influence of particular sensor.

Correction factors in compensation matrix may be defined as follows:

$$\omega_{i,i}^{comp} = 1 \quad \text{for } r_j^k \leq \tau_j^{min}$$

$$\omega_{i,i}^{comp} = \frac{\tau_j^{max} - r_j^k}{\tau_j^{max} - \tau_j^{min}} \quad \text{for } \tau_j^{min} < r_j^k < \tau_j^{max}$$

$$\omega_{i,i}^{comp} = 0 \quad \text{for } \tau_j^{max} \leq r_j^k$$

Correction factors may be based on the threshold values used in sensor fault (r;diagnosis process. In case that fault of sensor is not detected ($r_j^k \leq \tau_j^{min}$), estimation process may not be affected and tuning of the model may be fully preserved. When sensor fault probability increases, correction of tuning parameters may take place until sensor diagnostic residual parameters fall within the allowed band $\tau_j^{min} < r_j^k < \tau_j^{max}$. Beyond this point, for parameter being outside the allowed band ($\tau_j^{max} \le r_j^k$), estimation process may be compromised, and only unaffected health parameters could be tuned.

The proposed method has been evaluated in the software-in-the-loop environment to show that is practical alternative to hardware sensor redundancy. The developed algorithm detects, isolates, and accommodates sensor failures in industrial gas turbine control system. The method incorporates control system reconfiguration logic and is general enough to be applied to different engine configurations.

The method may consist of sensor failure detection, isolation logic and accommodation procedure. Two classes of sensor failures, namely hard and soft, have been evaluated using numerical simulation. Hard failures may be out-of-range or large bias errors that occur instantaneously in the sensed values. Soft failures may be small bias errors or drift errors that accumulate relatively slowly with time.

The hard failure detection and isolation logic may perform a straightforward threshold check on selected sensors residuals. Threshold values may be determined from sensor and process noise values as well as sensor range consideration. If a residual value is greater that the threshold, hard failure detection and isolation may follow immediately. Where hard failures can be detected almost instantly, soft failures are reliably detected only after some finite amount of time. This time to detect may be a function of threshold level, which determines detection reliability, model accuracy, and logic complexity.

Two modes of operation, normal and failure mode have been simulated. During normal mode, when no sensor failure is present, the accommodation tuner may consider a full set of estimated health parameters which are derived using all available measurements. In failure mode operation, where one or more of the sensors have failed, depending on the type of sensor failure accommodation tuner may select an appropriate measurement subset.

A threefold process may take place once the failure has occurred. Firstly the failure may be detected. Once a failure is known to have occurred, the specific faulty sensor may be isolated. Finally, when isolation has occurred, the failure may be compensated by reconfiguring dual lane control logic and the accommodation tuner. This threefold procedure may take place for both, hard and soft failures.

Figure 5:
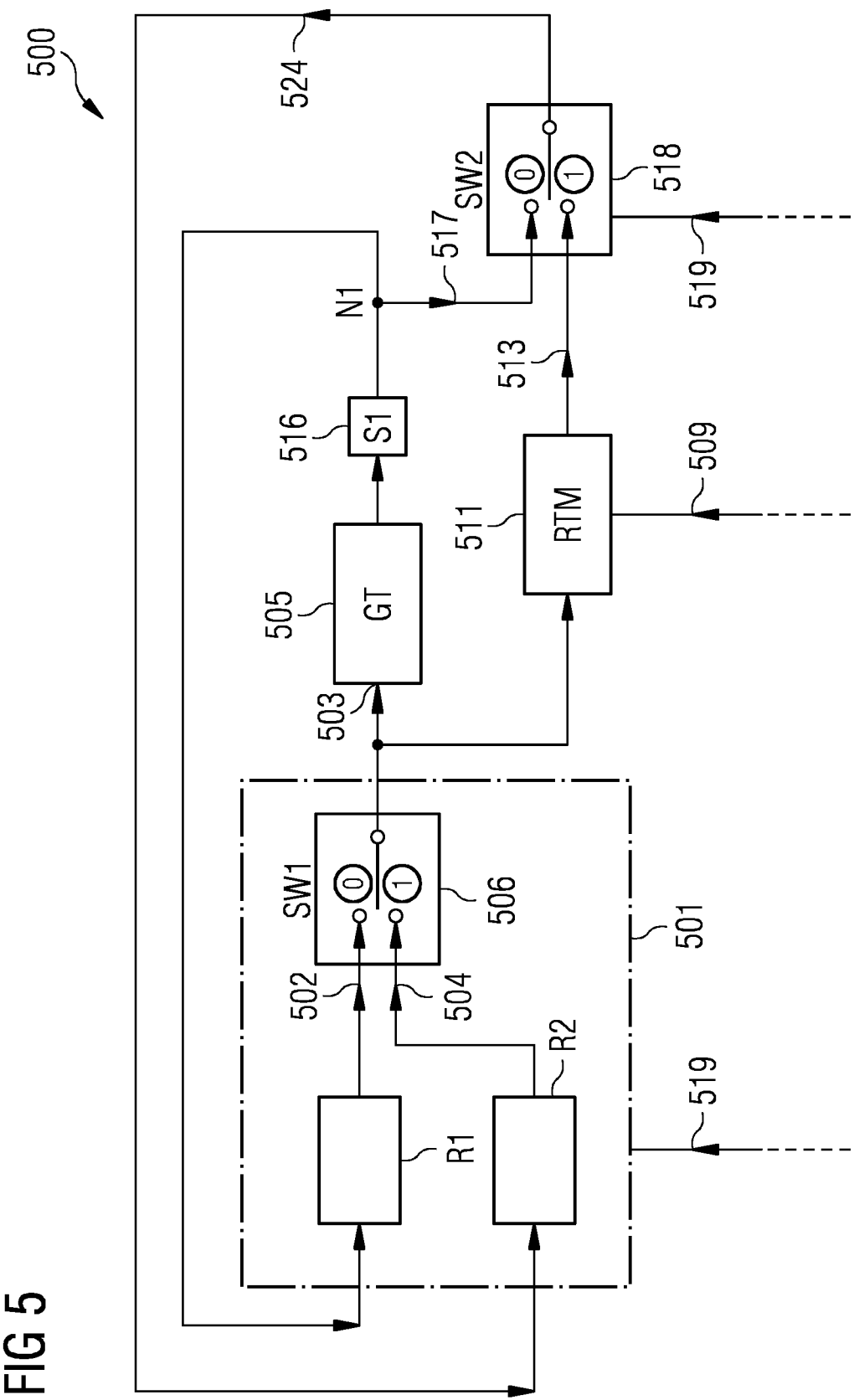
FIG. 5 schematically illustrates a portion of a system for controlling a gas turbine according to an embodiment of the present invention.
Figure 6:
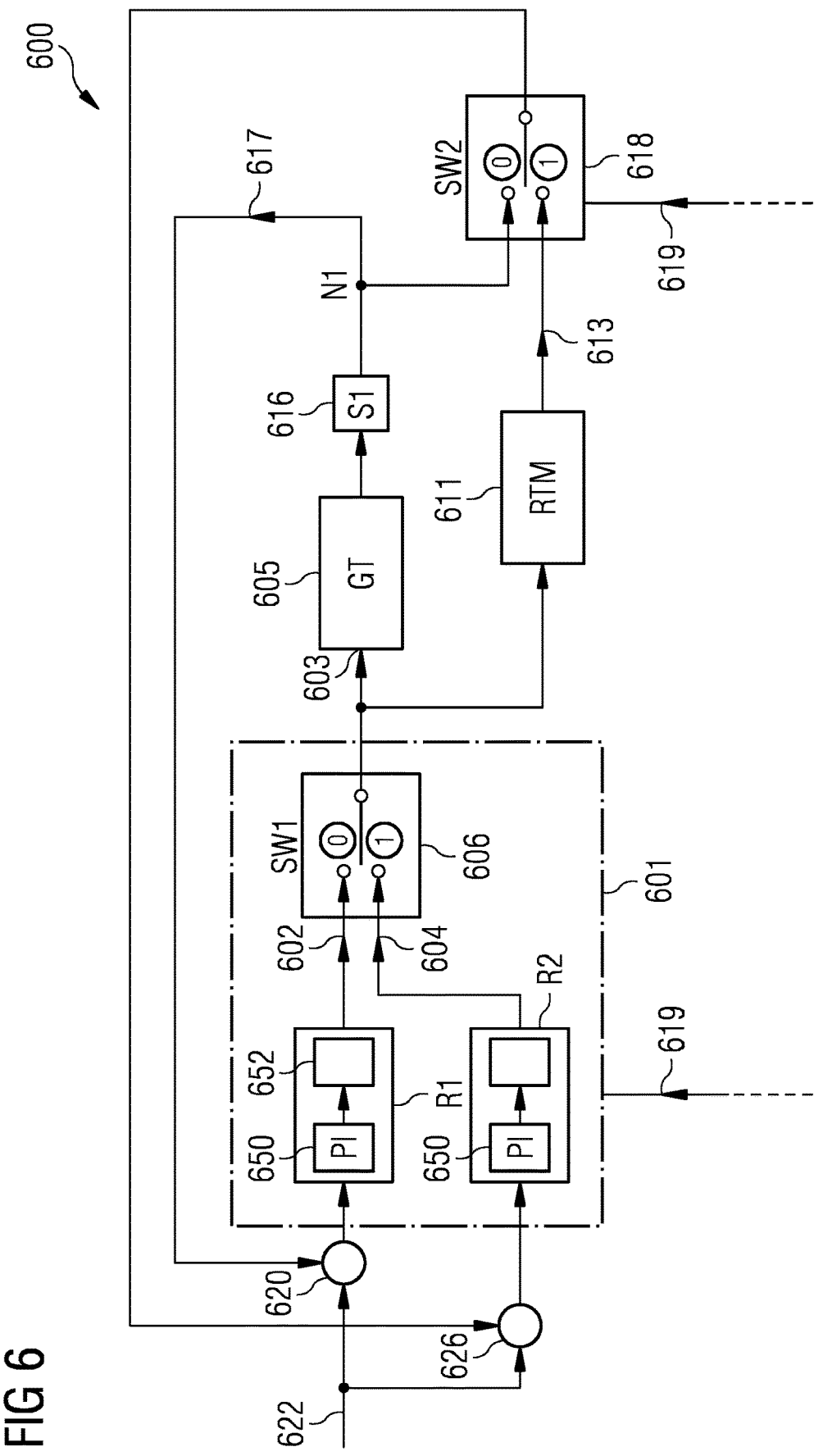
FIG. 6 schematically illustrates a portion of a system for controlling a gas turbine according to an embodiment of the present invention.

FIGS. 5 and 6 illustrate further portions of systems 500 and 600 for controlling a gas turbine according to further embodiments of the present invention. Herein, the system 500 comprises the control system 501 comprising the first regulator R1 and the second regulator R2. Both the first regulator R1 and the second regulator R2 use a one-dimensional table for deriving the respective first and second control signals 502, 504. The control system 501 is reconfigured using the control system reconfiguration signals 519.

Similarly, the control system 601 of the system 600 illustrated in FIG. 6 comprises a first regulator R1 and a second regulator R2. Each of these regulators comprises a PI controller 650 and a further lead/leg element 652.

The control loop of FIG. 5 provides a gross over-fuelling limit for the engine for the current compressor discharge pressure. A lookup table reads the current iso_corrected CDP and outputs an enforced maximum fuel flow.

Implementation of fault accommodation for compressor delivery pressure transducer in CDP limit control loop is presented in FIG. 5.

Regulator R2, integrated with redundant lane, may be active in case of presence of the pressure transducer fault. Because control in redundant lane may be based on virtual measurement synthesized by real-time model, regulator R2 may use conservative limiter settings.

Shaft power limit may be affected by compressor delivery pressure measurement and exhaust temperature measurement. A structure for dual lane compensation of these measurement faults is depicted in FIG. 6. Accommodation of CDP measurement fault may be achieved by using analytical sensor and regulator R2 with conservative settings.

Shaft power limiter may also be affected with exhaust thermocouple measurement fault. Accommodation of exhaust thermocouple fault may be devised with triple sensor redundancy, two thermocouples and one virtual sensor, in dual lane control configuration.

LIST OF REFERENCE SIGNS 100 system for controlling a gas turbine
101 control system
103 control signals
105 gas turbine
107 tuning system
109 tuning signals
111 modelling system
113 virtual measurement signal
115 sensor diagnostics system
117 sensor measurement signals
119 control system reconfiguration signals
121 tuner system reconfiguration signals
123 estimator
125 estimated health parameters
127 predicted health parameters
R1 first regulator
R2 second regulator
202 first control signals
204 second control signals
206 switching system
216 sensor
218 switching system
224 selected measurement signals
220,226 difference elements
308 second sensor
328 second sensor signals
434,438,442,448,446 function blocks
436,440,432 summation or difference elements
650 PI controller
652 lead/lag element

The invention claimed is:
1. A system for controlling a gas turbine, comprising:
a control system configured for providing control signals to the gas turbine;
a tuning system configured for providing tuning signals,
a modelling system configured for generating virtual measurement signals, the virtual measurement signals being based on the control signals and the tuning signals;
a sensor diagnostics system having sensor diagnostic logic for diagnosing at least one sensor measurement signal and outputting control system reconfiguration signals to the control system and tuner system reconfiguration signals to the tuning system,
wherein the sensor diagnostics system is distinct from the control system, wherein the control system reconfiguration signals are derived for improved reconfiguration of the control system, wherein the tuning signals are based at least on the tuner system reconfiguration signals, wherein the control signals are based on the at least one sensor measurement signal, the virtual measurement signals, and the control system reconfiguration signals, wherein the sensor diagnostic system is connected by way of a parallel connection to the control system and to the tuning system, wherein the control system reconfiguration signals to the control system and the tuner system reconfiguration signals to the tuning system are supplied via the parallel connection to simultaneously reconfigure the control system and the tuning system based on the sensor diagnostic logic.

2. The system according to claim 1, further comprising: an estimator configured for estimating health parameters based on the at least one sensor measurement signal, wherein estimated health parameters are provided to the tuning system, wherein the tuning signals are further based on the estimated health parameters.

3. The system according to claim 1, wherein the modelling system is further configured to generate predicted health parameters which are provided to the tuning system, wherein the tuning signals are further based on the predicted health parameters.

4. The system according to claim 1, wherein the virtual measurement signals are also provided to the sensor diagnostic system, wherein the control system reconfiguration signals and the tuner system reconfiguration signals are further based on the virtual measurement signals.

5. The system according to claim 1, wherein the control system comprises:
a first regulator;
a second regulator;
wherein control signals comprise first control signals and second control signals, wherein the first regulator is configured for generating the first control signals and wherein the second regulator is configured for generating the second control signals;
a control output switching system configured to output selectively the first control signals or the second control signals, wherein a state of the control output switching system is based on the control system reconfiguration signals.

6. The system according to claim 5, wherein the control system comprises:
a sensor output switching system configured to selectively provide the at least one sensor measurement signal or the virtual measurement signals to the second regulator, wherein a state of the sensor output switching system is based on the control system reconfiguration signals.

7. The system according to claim 6, wherein the sensor diagnostics system is configured to determine a sensor residual being a difference between the at least one sensor measurement signal and a corresponding virtual measurement signal among the virtual measurement signals.

8. The system according to claim 7, wherein the control system reconfiguration signals define a condition for switching the control output switching system based on the sensor residual and at least one threshold.

9. The system according to claim 7, wherein the control system reconfiguration signals define a condition for switching the sensor output switching system based on the sensor residual and at least one threshold.

10. The system according to claim 7, wherein the tuner system reconfiguration signals provided to the tuning system are used to respectively adjust a turbine state transition matrix and a filter gain matrix, based on the sensor residual, wherein respectively adjusted turbine state transition matrix and filter gain matrix define an evolution of operational states of the gas turbine.

11. The system according to claim 10, wherein the respectively adjusted turbine state transition matrix and filter gain matrix are defined as a product of: 1) a compensation matrix and 2) an initial turbine state transition matrix and filter gain matrix, the compensation matrix being diagonal and having elements differing from one (1) depending on a magnitude of a corresponding residual.

12. The system according to claim 1, wherein the at least one sensor measurement signal comprises a compressor discharge pressure measurement signal,
wherein a rotation shaft power is controlled to be below a limit and/or compressor discharge pressure is limited according to a predetermined schedule.

13. A method for controlling a gas turbine, comprising:
by a control system, providing control signals to the gas turbine;
by a tuning system, providing tuning signals,
by a modelling system, generating virtual measurement signals, the virtual measurement signals being based on the control signals and the tuning signals;
by a sensor diagnostics system having sensor diagnostic logic for diagnosing at least one sensor measurement signal, outputting control system reconfiguration signals to the control system and tuner system reconfiguration signals to the tuning system,
wherein the sensor diagnostics system is distinct from the control system,
wherein the control system reconfiguration signals are derived for improved reconfiguration of the control system,
wherein the tuning signals are based at least on the tuner system reconfiguration signals, wherein the control signals are based on the at least one sensor measurement signal, the virtual measurement signals, and the control system reconfiguration signals,
connecting the sensor diagnostic system by way of a parallel connection to the control system and to the tuning system, and
supplying via the parallel connection the control system reconfiguration signals to the control system and the tuner system reconfiguration signals to the tuning system to simultaneously reconfigure the control system and the tuning system based on the sensor diagnostic logic.

14. The method of claim 13, wherein a rotation shaft power is controlled to be below a limit.

15. The system according to claim 1, wherein a gradual reconfiguration of dual lane logic and the tuning system, based on the probability of sensor faults, accommodates both in-range (hard) sensor failures and out-of-range (soft) sensor failures.

* * * * *